United States Patent [19]

Töpfl

[11] 4,134,867

[45] Jan. 16, 1979

[54] FINISHING OF LEATHER WITH REACTION PRODUCTS OF EPOXIDES AND FATTY ACIDS

[75] Inventor: Rosemarie Töpfl, Dornach, Switzerland

[73] Assignee: Ciba-Geigy Corporation, Ardsley, N.Y.

[21] Appl. No.: 796,636

[22] Filed: May 13, 1977

[30] Foreign Application Priority Data

May 20, 1976 [CH] Switzerland ........................ 6351/76

[51] Int. Cl.² ........................ C08G 8/32; C08G 59/00; C08L 61/26; C08L 63/02

[52] U.S. Cl. .................................... 260/21; 8/94.1 R; 8/94.24; 260/18 EP; 260/29.4 R; 260/33.8 R; 428/413; 428/473; 428/540; 428/907; 424/78; 252/8.57

[58] Field of Search ............. 260/21, 18 EP; 428/413, 428/473, 580, 540; 8/94.1 R, 94.24

[56] References Cited

U.S. PATENT DOCUMENTS

| | | | |
|---|---|---|---|
| 2,880,116 | 3/1959 | Alps et al. | 428/473 |
| 3,567,668 | 3/1971 | Guldenpfennig | 260/21 |
| 3,795,533 | 3/1974 | Gauri | 428/540 |
| 3,860,540 | 1/1975 | Abel et al. | 260/21 |
| 3,951,891 | 4/1976 | Töpfl et al. | 260/18 EP |
| 4,017,432 | 4/1977 | Carey | 260/18 EP |

FOREIGN PATENT DOCUMENTS

| | | | |
|---|---|---|---|
| 569227 | 1/1959 | Canada | 260/18 EP |
| 1446266 | 8/1976 | United Kingdom | 260/21 |

*Primary Examiner*—Ronald W. Griffin
*Attorney, Agent, or Firm*—Edward McC. Roberts

[57] ABSTRACT

A process for finishing leather is provided in which the leather is treated with a preparation containing
(1) a reaction product of
(a) an epoxide and
(b) a dimerized or trimerized fatty acid and
(2) an etherified aminoplast precondensate.
The treated leather is then dried at 50 to 120° C.

22 Claims, No Drawings

FINISHING OF LEATHER WITH REACTION PRODUCTS OF EPOXIDES AND FATTY ACIDS

The subject of the present invention is a process for finishing leather, in which the leather is treated with a preparation which contains at least (1) a reaction product of (a) an epoxide which contains at least two epoxide groups per molecule and has an epoxide content of 0.9 to 3.2 epoxide group equivalents per kg and (b) a dimerised and/or trimerised fatty acid which is derived from monomeric unsaturated fatty acids with 16 to 22 carbon atoms and (2) an aminoplast precondensate which contains alkyl ether groups and the treated leather is dried at 50 to 120° C.

The preparations are preferably in the form of solutions in organic solvents or, above all, in the form of aqueous dispersions or, in particular, of aqueous emulsions.

The epoxides of component (a) are preferably derived from polyhydric phenols or polyphenols, such as resorcinol or phenol-formaldehyde condensation products of the resole or novolac type. In particular, bisphenols such as bis-(4-hydroxyphenyl)-methane and, above all, 2,2-bis-(4'-hydroxyphenyl)-propane are preferred as starting compounds for the manufacture of the epoxides.

Polyglycidyl ethers of 2,2-bis-(4'-hydroxyphenyl)-propane which have an epoxide content of 0.9 to 3.2, and preferably 1 to 2.5, epoxide group equivalents per kg and which preferably correspond to the formula

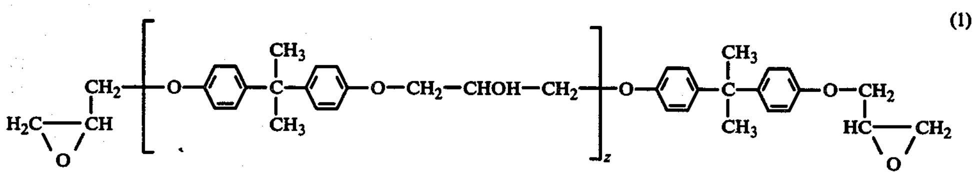

(1)

in which z denotes an average number with values of 1 to 6 and preferably of 1.5 to 6, may be mentioned in particular. Epoxides of this type are obtained by reacting epichlorohydrin with 2,2-bis-(4'-hydroxyphenyl)-propane.

The component (b) relates to dimerised and/or trimerised fatty acids which are derived from unsaturated fatty acids which preferably have at least one, and above all 2 to 5, ethylenically unsaturated bonds, such as hexadecenoic acid, oleic acid, elaidic acid, hiragonic acid, licanic acid, eleostearic acid, arachidonic acid and clupanodonic acid and, in particular, linoleic acid and linolenic acid. Accordingly, dimerised acids contain 32 to 44 carbon atoms and trimerised acids contain 48 to 68 carbon atoms. These fatty acids, and in some cases also mixtures thereof, can be obtained from natural oils and fats which contain them, above all in the form of glycerides.

Preferably, technical grade mixtures of the polymerised fatty acids, which can also contain smaller proportions of the monomeric acids, are employed in the process according to the invention. Thus, for example, a mixture of 2 to 10 percent by weight of dimerised linoleic acid and linolenic acid, 85 to 95 percent by weight of trimerised linoleic acid and linolenic acid and 1 to 5 percent by weight of unpolymerised linoleic acid and linolenic acid is employed as a preferred component (b).

The reaction product (1) in the formulations employed in the process according to the invention as a rule consists of 1 to 1.5 acid equivalents of component (b) per epoxide equivalent of component (a). The reaction product (1), which is in itself known, can previously be formed according to known methods, that is to say by reacting components (a) and (b) at 80 to 120° C and especially at 100° C, preferably in organic solvents and if appropriate in the presence of a catalyst.

Organic solvents which can be used are, above all, water-soluble organic solvents and in particular appropriately those which are miscible with water in all proportions. Examples which may be mentioned are dioxane, isopropanol, ethanol, diethylene glycol monobutyl ether, dimethylformamide and especially ethylene glycol monobutyl ether (= n-butyl-glycol).

In addition, it is, however, also possible to carry out the reaction in organic solvents which are insoluble in water, for example in hydrocarbons, such as benzine, benzene, toluene or xylene, or in halogenated hydrocarbons, such as methylene bromide, carbon tetrachloride, ethylene chloride, ethylene bromide, s-tetrachloroethane and especially also in trichloroethylene.

Possible catalysts, in the presence of which the reaction product (1) can be pre-formed, are, above all, tertiary amines or quaternary ammonium salts. Such amines or ammonium salts preferably contain, as substituents of the nitrogen atom, alkyl groups with 1 to 4 carbon atoms, above all ethyl groups and especially methyl groups, and these groups are optionally substituted by phenyl. The ammonium salts are, for example, in the form of sulphates and especially in the form of chlorides or hydroxides. N-Benzyldimethylamine may be mentioned as an example of a tertiary amine of this type and tetramethyl-ammonium chloride and tetramethyl-ammonium hydroxide and also benzyltrimethyl-ammonium hydroxide may be mentioned as examples of quaternary ammonium salts of this type.

In the preparations employed in the process according to the invention, component (2) is present only as a mixed component. The aminoplast condensates used as component (2) are appropriately completely or, in particular, partially etherified methylol compounds of nitrogen-containing aminoplastforming agents, such as urea and its derivatives, for example thiourea, ethyleneurea, propyleneurea or glyoxalmonourein.

However, etherified methylolaminotriazines, such as, for example, alkyl ethers of highly methylolated melamine, the alkyl radicals of which contain 1 to 6, and preferably 3 to 6, carbon atoms, can preferably be used. Possible alkyl radicals are, inter alia, methyl, ethyl, n-propyl, isopropyl, n-butyl and also n-hexyl radicals. In addition to such alkyl radicals, yet further rdicals, for example polyglycol radicals, can also be present in the molecule. The n-butyl ethers of a highly methylolated melamine, which contain 2 to 3 n-butyl groups in the molecule, are also preferred. Highly methylolated melamines are here to be understood as those which have an average of at least 5, and appropriately about 5.5, methylol groups. Etherified methylolaminotriazines which are insoluble in water are preferably used.

The preparations which are employed in the process according to the invention preferably contain 50 to 95, and especially 60 to 90, percent by weight of the reaction product (1) and 5 to 50, and especially 10 to 40, percent by weight of the aminoplast precondensate (2) as the mixed component.

Furthermore, preparations which, in addition to the reaction product (1) and to the aminoplast precondensate (2), contain (3) a reaction product of (a) an epoxide which contains at least two epoxide groups per molecule and has an epoxide content of 0.9 to 3.2 epoxide group equivalents per kg, (b) a dimerised and/or trimerised fatty acid which is derived from monomeric unsaturated fatty acids with 16 to 22 carbon atoms and (c) a fatty amine with 12 to 24 carbon atoms and, optionally, (d) an anhydride of an aromatic dicarboxylic acid with at least 8 carbon atoms, of an aliphatic monocarboxylic acid with at least 2 carbon atoms or of an aliphatic dicarboxylic acid with at least 4 carbon atoms, optionally (e) an aliphatic saturated dicarboxylic acid with 2 to 14 carbon atoms and optionally (f) a difunctional compound which differs from components (a), (d) and (e), or (4) a reaction product of the aminoplast precondensate (2) and the reaction product (3) are employed in the process according to the invention.

The components (a) and (b) of the reaction product (3) are identical to the components (a) and (b) of reaction product (1). The reaction products (3) differ from the reaction products (1) in that they have always been pre-formed in addition from component (c) and, optionally, at least one of the components (d), (e) and/or (f).

Compounds which have proved very suitable as components (b) are, above all, mono-fatty amines with 12 to 24 carbon atoms. As a rule, these are amines of the formula $$H_3C-(CH_2)_x-NH_2 \qquad (2),$$

in which x represents an integer from 11 to 23 and preferably from 17 to 21. The amines are thus, for example, laurylamine, palmitylamine, arachidylamine or behenylamine or, in particular, stearylamine. Mixtures of such amines, such as are obtainable as industrial products, can also be used.

An anhydride of a monocyclic or bicyclic aromatic dicarboxylic acid with 8 to 12 carbon atoms, of an aliphatic dicarboxylic acid with 4 to 10 carbon atoms or of an aliphatic monocarboxylic acid with 2 to 10 carbon atoms can preferably be employed as the optional component (d). Anhydrides of a monocyclic aromatic dicarboxylic acid with 8 to 10 carbon atoms have proved particularly advantageous for this purpose. Phthalic anhydride which is optionally substituted by methyl is of particular interest.

Accordingly, anhydrides such as, for example, acetic anhydride, maleic anhydride or phthalic anhydride can be used as component (d).

If the reaction products (3) have been pre-formed using component (e), the dicarboxylic acids are those which have at least 2 to 4 carbon atoms and which correspond, for example, to the formula $$HOOC-(CH_2)_{y-1}-COOH \qquad (3)$$

in which y is an integer from 1 to 13 and preferably from 5 to 13. Those dicarboxylic acids of the formula (3) in which y is an integer from 5 to 9 are particularly suitable.

Accordingly, for example, dicarboxylic acids such as oxalic acid, malonic acid, succinic acid, glutaric acid, adipic acid, pimelic acid, suberic acid, azelaic acid or sebacic acid and nonane-, decane-, undecane- or dodecane- dicarboxylic acid can be used as component (e). The components (d) and (e) can optionally complement one another.

The difunctional component (f), which is also optional, preferably contains, as functional groups or atoms, halogen atoms bonded to an alkyl radical, vinyl or carboxylic acid ester groups or at most one epoxide, carboxylic acid or hydroxyl group together with another functional group or another atom of the indicated type. The compounds are, in particular, difunctional organic compounds which contain, as functional groups or atoms, chlorine or bromine atoms bonded to an alkyl radical, or vinyl or carboxylic acid alkyl ester groups or at most one epoxide or carboxylic acid group together with another functional group or another atom of the indicated type.

Suitable difunctional organic compounds are aliphatic. They are, for example, epihalogenohydrins, such as epibromohydrin or above all epichlorohydrin.

Examples of other preferred difunctional compounds which can be used are glyceroldichlorohydrin, acrylic acid, methylolacrylamide and, in particular, acrylonitrile.

Like the reaction products (1), the reaction products (3) are also known and can be pre-formed according to known methods. Such methods are disclosed, for example, in British Pat. Specification No. 1,446,266. The quantity ratios between the components (a), (b), (c) and, optionally, (d), (e) and (f) are preferably so chosen that 0.2 to 1.5, and preferably 0.4 to 1.5, acid equivalents of component (b), 0.1 to 0.7 amino group equivalent of component (c) and optionally 0.1 to 0.8, and preferably 0.1 to 0.6, acid equivalent of component (d) and (e) and, optionally, 0.1 to 0.7 mol of component (f) are employed per epoxide group equivalent of component (a).

Accordingly, formulations which contain, as preferred reaction products (3), those products obtained from (a) one epoxide equivalent of a reaction product of epichlorohydrin and 2,2-bis-(4'-hydroxyphenyl)-propane, (b) 0.2 to 1.5 acid equivalents of a mixture of dimerised and trimerised fatty acids which are derived from monomeric unsaturated fatty acids with 16 to 22 carbon atoms and 2 to 5 ethylenically unsaturated bonds and (c) 0.1 to 0.7 amino equivalent of a mono-fatty amine of the formula $$H_3C-(CH_2)_x-NH_2 \qquad (4)$$

in which x denotes an integer from 17 to 21, and, optionally, (d) 0.1 to 0.8 acid equivalent of an anhydride of a monocyclic aromatic dicarboxylic acid with 8 to 10 carbon atoms or of an aliphatic dicarboxylic acid with 4 to 10 carbon atoms, optionally (e) 0.1 to 0.8 acid equivalent of a dicarboxylic acid of the formula $$HOOC-(CH_2)_{y-1}-COOH$$

in which y is an integer from 3 to 13, and optionally (f) 0.1 to 0.7 mol of epibromohydrin, epichlorohydrin, glycerol dichlorohydrin, acrylic acid, methylolacrylamide or acrylonitrile are employed in the process according to the invention.

The reaction products (3) as a rule have an acid number of 5 to 100 and preferably of 20 to 60.

The reaction products (4), which, although less preferred, can be contained, in place of the reaction products (3) in the formulations employed in the process according to the invention, are also in themselves known and can be pre-formed according to known methods. Such methods are again disclosed in British Pat. Specification No. 1,446,266.

When carrying out the reaction to give preferred reaction products (4), 10 to 80, and preferably 30 to 60, percent by weight of the aminoplast precondensate (2) and 40 to 70 percent by weight of the reaction product (3) are employed.

Preferred preparations, which are employed in the process according to the invention, contain 20 to 60 percent by weight of reaction product (1), 20 to 50 percent by weight of reaction product (3) and 15 to 40 percent by weight of the aminoplast precondensate (2) or 20 to 60 percent by weight of reaction product (1), 30 to 70 percent by weight of reaction product (4) and 2 to 30 percent by weight of the aminoplast precondensate (2) and the sum of reaction products (1) and (3) or (1) and (4) and the aminoplast precondensate (2) always gives 100 percent by weight.

The solids content in the formulations is about 40 to 70 percent by weight.

The preparations of the reaction products and aminoplast precondensates are used in the process according to the invention as finishing agents for leather. As a rule, they are applied from an aqueous medium in which the reaction products are present in an emulsified form. For this purpose, the preparations of the reaction products are mixed with water and optionally with an organic solvent which is insoluble in water and/or with a wetting agent and dispersing agent. The stable aqueous emulsions thus obtained can have a pH value of about 3 to 8 and preferably 6 to 7.5. The solids content can be about 10 to 40 percent by weight. Examples of suitable solvents are halogenated, above all chlorinated, hydrocarbons, such as ethylene chloride, trichloroethylene and especially tetrachloroethylene. Examples of suitable wetting agents and dispersing agents are adducts of an alkylene oxide, preferably ethylene oxide, and higher molecular aliphatic or cycloaliphatic amines, alcohols, fatty acids or fatty amides, which optionally can also be esterified, on the hydroxyl groups, with polybasic or organic acids or, if they are nitrogen compounds, can also be quaternised. Furthermore, these compounds can also be reacted with further components, for example in order to achieve a crosslinking effect. Compounds employed with particular success are, inter alia, adducts of hydroabietyl alcohol and ethylene oxide which are crosslinked with hexamethylene diisocyanate.

In addition to the emulsified reaction products or the mixtures of the reaction products and the aminoplast precondensates, the application liquors can also contain further additives, such as, for example, acids, salts or also dressing or improving agents. Examples of acids which may be mentioned are oxalic acid, formic acid, acetic acid and, above all, sulphuric acid and hydrochloric acid and especially phosphoric acid.

Relative to the substrate, the amount of the mixture of reaction product and aminoplast precondensate (solvent and water not included in the calculation) is appropriately 1 to 10 g/m$^2$. As a rule, the application is made at 20 to 50° C preferably at room temperature, and according to known methods, for example by dipping, sprinkling or brushing and above all by spraying.

The leather to be dressed can be of any origin, so-called grain leathers, that is to say leathers which are finished on the grain side, preferably being used. Finishing can appropriately be carried out in two stages by applying the preparations, for example together with a dyestuff or pigment suitable for colouring leather, by the process according to the invention and drying and then applying a colourless formulation which, for example, imparts an additional gloss to the coloured layer.

In the first stage the leather is, specifically, sprayed two to four times crosswise with the formulation containing the dyestuff or pigment and subjected to intermediate drying for 1 to 5 minutes after each spraying and is then sprayed one to three times with a colourless formulation and finally dried for 1 to 6 hours. Intermediate drying and final drying are carried out at 50 to 120° C and preferably 50 to 70° C.

The leathers finished by the process according to the invention have very good general fastness properties. They are, above all, very fast to light and in particular to wet processing and dry rubbing and are also fast to hot pressing and cracking. The handle also displays a distinct improvement. The leather finished in this way can thus be termed easy-care; when all of the fastness properties are taken into account, this leather is superior to a leather finished with polyurethanes or polyacrylates. In addition to the effects described, a good antimicrobial finish of the leather is also achieved.

The antimicrobial action is obtained against representatives of the Gram-positive and Gram-negative bacteria, such as, for example, against Staphylococcus aureus, Escherichia coli and Proteus vulgaris, or against fungi, such as, for example, Trichophyton mentagrophytes.

The leathers finished by the process according to the invention are above all distinguished by an outstanding adhesion of the finish, which has not been achieved hitherto, so that the finished leather can be stacked.

In the examples which follow parts are parts by weight and percentages percentages by weight.

Preparation Examples

EXAMPLE 1

92.4 g (0.2 epoxide equivalent) of an epoxide formed from 2,2-bis-(4'-hydroxyphenyl)-propane and epichlorohydrin are dissolved together with 54 g of ethylene glycol monobutyl ether and 66.8 g (0.24 acid equivalent) of a mixture consisting of about 91% of trimerised acid with 54 carbon atoms (= $C_{54}$ acid) and about 5% of dimerised $C_{36}$ acid (on the basis of linoleic acid and linolenic acid).

1 g of N-benzyldimethylamine is then added and the reaction mixture is kept at 100° C for 4 hours.

The reaction mixture is then diluted with 104.2 g of tetrachloroethylene and a 50% strength clear resin solution is obtained. The acid number is 22.4.

180 g of this resin solution are now mixed together with 14.4 g of a 70% strength solution of hexamethylolmelamine di- and tri-butyl ether in n-butanol and the mixture is emulsified with 34 g of a 50% strength aqueous solution of an adduct obtained from hydroabietyl alcohol and 200 mols of ethylene oxide and crosslinked with 1% of hexamethylene 1,6-diisocyanate.

After adding 104.6 g of water, a finely dispersed emulsion is obtained. The resin content is 30% and the pH value 6.7.

EXAMPLE 2

123 g of the 50% strength resin solution according to Example 1 are mixed together with 55.5 g of a 70% strength solution of hexamethylolmelamine di- and tri-butyl ether in n-butanol and the mixture is emulsified with 34 g of a 50% strength aqueous solution of an adduct of hydroabietyl alcohol and 200 mols of ethylene oxide, crosslinked with 1% of hexamethylene 1,6-diisocyanate.

After adding 120.5 g of water, a finely dispersed emulsion is obtained. The resin content is 30% and the pH value 6.7.

EXAMPLE 3

197 g (0.2 epoxide equivalent) of an epoxide according to Example 1 are dissolved together with 86 g of ethylene glycol monobutyl ether and 66.8 g (0.24 acid equivalent) of the mixture of the polymerised acids according to Example 1, at 100° C. 1 g of N-benzyldimethylamine is then added and the reaction mixture is kept at 100° C for 4 hours.

After diluting with 177.8 g of tetrachloroethylene, a 50% strength clear resin solution is obtained. The acid number is 19.7.

180 g of this resin solution are mixed together with 14.4 g of a 70% strength solution of hexamethylolmelamine diand tri-butyl ether in n-butanol and the mixture is emulsified with 34 g of a 50% strength aqueous solution of an adduct of hydroabietyl alcohol and 200 mols of ethylene oxide, crosslinked with 1% of hexamethylene 1,6-diisocyanate.

After adding 104.6 g of water, a finely dispersed emulsion is obtained. The resin content is 30% and the pH value 7.2.

EXAMPLE 4

92.4 g (0.2 epoxide equivalent) of an epoxide according to Example 1 together with 27 g (0.1 amine equivalent) of stearylamine, 27.8 g (0.1 acid equivalent) of a mixture of the polymerised acids according to Example 1 and 50 g of ethylene glycol monobutyl ether, are kept at 100° C for 4 hours. 5.3 g (0.1 mol) of acrylonitrile are then added and the reaction mixture is kept at 100° C for a further one hour. After diluting with 102.5 g of tetrachloroethylene, a 50% strength clear resin solution is obtained. The acid number is 32 and the viscosity is 21,800 cP at 20° C.

120 g of this resin solution are mixed with 50 g of a 75% strength solution of hexamethylolmelamine di- and tri-butyl ether in n-butanol and the mixture is emulsified with 34 g of a 50% strength aqueous solution of an adduct of hydroabietyl alcohol and 200 mols of ethylene oxide, crosslinked with 1% of hexamethylene 1,6-diisocyanate.

After adding 122 g of water, a finely dispersed emulsion is obtained. The resin content is 30% and the pH value 6.1.

The resulting emulsion is mixed with the emulsion according to Example 1 in a weight ratio of 1:1.

EXAMPLE 5

The procedure is as indicated in Example 4 but the resulting emulsion is mixed with the emulsion according to Example 1 in a weight ratio (resulting emulsion: emulsion according to Example 1) of (2:1).

Application Examples

EXAMPLE 6

30 parts of a pigment dispersion which contains 20% of pigment C.I. 74,160 (Pigment Blue 15) are mixed with 300 parts of the emulsion according to Example 2 and 10 parts of phosphoric acid and the mixture is then diluted with water to 1,000 parts. The mixture thus obtained is sprayed three times crosswise onto blue coloured napa leather, each spraying being followed by intermediate drying for 1 minute at 60° C.

The leather is then sprayed twice crosswise at 25 to 30° C with a colourless gloss solution consisting of 300 parts of the emulsion according to Example 2, 10 parts of phosphoric acid and 690 parts of water. The leather is then dried for two hours at 60° C and pressed at 80° C/100 bars.

The leather pigmented in this way displays very good fastness to dry and wet rubbing. It is fast to cracking and is distinguished, above all, by outstanding adhesion of the finish.

Similar results are achieved with the emulsions according to Example 1 or 3.

EXAMPLE 7

The procedure is as indicated in Example 6 but the leather is sprayed with an aqueous mixture which contains 300 parts of the emulsion according to Example 4 in addition to the pigment dispersion and phosphoric acid and then with an aqueous gloss solution which contains 300 parts of the emulsion according to Example 5 in addition to phosphoric acid.

The good results according to Example 6 are achieved in the present example also.

What is claimed is:

1. A process for finishing leather, in which the leather is treated with a preparation which contains (1) the reaction product of (a) an epoxide containing at least two epoxide groups per molecule and having an epoxide content of 0.9 to 3.2 epoxide group equivalents per kg and (b) a dimerised or trimerised fatty acid derived from a monomeric unsaturated fatty acid with 16 to 22 carbon atoms and (2) an aminoplast precondensate containing alkyl ether groups; and the treated leather is dried at 50 to 120° C.

2. A process according to claim 1, in which the preparation is an organic solution or an aqueous dispersion or emulsion.

3. A process according to claim 1, in which an epoxide which is derived from a bisphenol is used as component (a).

4. A process according to claim 1, in which a polyglycidyl ether of 2,2-bis-(4'-hydroxyphenyl)-propane is used as component (a).

5. A process according to claim 1, in which a reaction product of epichlorohydrin and 2,2-bis-(4'-hydroxyphenyl)-propane is used as component (a).

6. A process according to claim 1, in which a component (b) is used which is derived from an unsaturated fatty acid with 2 to 5 ethylenically unsaturated bonds.

7. A process according to claim 1, in which a mixture of 2 to 10 percent by weight of dimerised linoleic acid and linolenic acid, 85 to 95 percent by weight of trimerised linoleic acid and linolenic acid and 1 to 5 percent by weight of unpolymerised linoleic acid and linolenic acid is used as component (b).

8. A process according to claim 1, in which a reaction product (1) containing 1 to 1.5 acid equivalents of component (b) per epoxide equivalent of component (a) is used.

9. A process according to claim 1, in which an alkyl ether of a methylolaminotriazine with 1 to 6 carbon atoms in the alkyl radical is used as the aminoplast precondensate (2).

10. A process according to claim 1, in which a n-butyl ether of a penta- or hexa-methylolmelamine with 2 to 3 n-butyl radicals is used as the aminoplast precondensate (2).

11. A process according to claim 1, in which the preparation contains 50 to 95 percent by weight of the reaction product (1) and 5 to 50 percent by weight of the aminoplast precondensate (2).

12. A process according to claim 1, in which a preparation is used, which, in addition to the reaction product (1) and the aminoplast precondensate (2), contains (3) a reaction product of (a) an epoxide containing at least two epoxide groups per molecule and having an epoxide content of 0.9 to 3.2 epoxide group equivalents per kg, (b) a dimerised or trimerised fatty acid derived from monomeric unsaturated fatty acid with 16 to 22 carbon atoms and (c) a fatty amine with 12 to 24 carbon atoms or (4) a reaction product of the aminoplast precondensate (2) and the reaction product (3).

13. A process according to claim 12 in which a preparation is used which contains 20 to 60 percent by weight of the reaction product (1), 15 to 40 percent by weight of the aminoplast precondensate (2) and 20 to 50 percent by weight of a reaction product (3) of (a) an epoxide containing at least two epoxide groups per molecule and having an epoxide content of 0.9 to 3.2 epoxide group equivalents per kg, (b) a dimerised or trimerised fatty acid derived from monomeric unsaturated fatty acid with 16 to 22 carbon atoms or and (c) a fatty amine with 12 to 24 carbon atoms.

14. The process of claim 13, wherein reaction product (3) further contains, reacted therewith, at least one of components (d) an anhydride of an aromatic dicarboxylic acid with at least 8 carbon atoms, of an aliphatic monocarboxylic acid with at least 2 carbon atoms or of an aliphatic dicarboxylic acid with at least 4 carbon atoms, (e) an aliphatic saturated dicarboxylic acid with 2 to 14 carbon atoms, and (f) a difunctional compound selected from the group consisting of epibromohydrin, epichlorohydrin, glycerol dichlorohydrin, acrylic acid, methylolacrylamide and acrylonitrile.

15. A process according to claim 12, in which a preparation is used which contains 20 to 60 percent by weight of the reaction product (1), 2 to 30 percent by weight of the aminoplast precondensate (2) and 20 to 70 percent by weight of a reaction product (4) obtained from 30 to 60 percent by weight of the aminoplast precondensate (2) and 40 to 70 percent by weight of a reaction product (3).

16. The process of claim 12, wherein reaction product (3) further contains, reacted therewith, at least one of components (d) an anhydride of an aromatic dicarboxylic acid with at least 8 carbon atoms, of an aliphatic monocarboxylic acid with at least 2 carbon atoms or of an aliphatic dicarboxylic acid with at least 4 carbon atoms, (e) an aliphatic saturated dicarboxylic acid with 2 to 14 carbon atoms, and (f) a difunctional compound selected from the group consisting of epibromohydrin, epichlorohydrin, glycerol dichlorohydrin, acrylic acid, methylolacylamide and acrylonitrile.

17. A process according to claim 1, in which a preparation is used, which, in addition to the reaction product (1) and the aminoplast precondensate (2), contains (3) a reaction product of (a) one epoxide equivalent of a reaction product of epichlorohydrin and 2,2-bis-(4'-hydroxyphenyl)-propane, (b) 0.2 to 1.5 acid equivalents of a mixture of dimerised and trimerised fatty acids derived from a monomeric unsaturated fatty acid with 16 to 22 carbon atoms and 2 to 5 ethylenically unsaturated bonds and (c) 0.1 to 0.7 amino equivalent of a mono-fatty amine of the formula $$H_3C-(CH_2)_x-NH_2,$$

in which x is an integer from 17 to 21.

18. The process of claim 17, wherein reaction product (3) further contains, reacted therewith, at least one of components (d) 0.1 to 0.8 acid equivalent of an anhydride of a monocyclic aromatic dicarboxylic acid with 8 to 10 carbon atoms or of an aliphatic dicarboxylic acid with 4 to 10 carbon atoms, (e) 0.1 to 8.0 acid equivalent of a dicarboxylic acid of the formula $$HOOC-(CH_2)_{y-1}-COOH$$

in which y is an integer from 3 to 13, and (f) 0.1 to 0.7 mol of a difunctional compound selected from the group consisting of epibromohydrin, epichlorohydrin, glycerol dichlorohydrin, acrylic acid, methylolacrylamide and acrylonitrile.

19. A process according to claim 1, in which a preparation is used, which, in addition to the reaction product (1) and the aminoplast precondensate (2), contains a reaction product (4) obtained from 30 to 60 percent by weight of the aminoplast precondensate (2) and 40 to 70 percent by weight of a reaction product (3) of (a) an epoxide containing at least two epoxide groups per molecule and having an epoxide content of 0.9 to 3.2 epoxide group equivalents per kg, (b) a dimerised or trimerised fatty acid derived from monomeric unsaturated fatty acid with 16 to 22 carbon atoms and (c) a fatty amine with 12 to 24 carbon atoms.

20. The process of claim 19, wherein reaction product (3) further contains, reacted therewith, at least one of components (d) an anhydride of an aromatic dicarboxylic acid with at least 8 carbon atoms, of an aliphatic monocarboxylic acid with at least 2 carbon atoms or of an aliphatic dicarboxylic acid with at least 4 carbon atoms, (e) an aliphatic saturated dicarboxylic acid with 2 to 14 carbon atoms, and (f) a difunctional compound selected from the group consisting of epibromohydrin, epichlorohydrin, glycerol dichlorohyrin, acrylic acid, methylolacrylamide and acrylonitrile.

21. The leather finished according to the process of claim 1.

22. Preparation for carrying out the process according to claim 1 which contains (1) a reaction product of (a) an epoxide containing at least two epoxide groups per molecule and having an epoxide content of 0.9 to 3.2 epoxide group equivalents per kg and (b) a dimerised or trimerised fatty acid which is derived from a monomeric unsaturated fatty acid with 16 to 22 carbon atoms and (2) an aminoplast precondensate containing alkyl ether groups.

* * * * *